United States Patent
Sonnekalb et al.

(10) Patent No.: US 11,479,083 B2
(45) Date of Patent: Oct. 25, 2022

(54) FLOW CIRCUIT SYSTEM FOR A VEHICLE AND METHOD THEREOF

(71) Applicant: KONVEKTA AG, Schwalmstadt (DE)

(72) Inventors: Michael Sonnekalb, Schwalmstadt (DE); Sebastian Fink, Willingshausen (DE)

(73) Assignee: Konvekta AG, Schwalmstadt (DE)

(*) Notice: Subject to any disclaimer, the term of this patent is extended or adjusted under 35 U.S.C. 154(b) by 1 day.

(21) Appl. No.: 16/058,624

(22) Filed: Aug. 8, 2018

(65) Prior Publication Data

US 2019/0047363 A1 Feb. 14, 2019

(30) Foreign Application Priority Data

Aug. 13, 2017 (DE) .......................... 102017118425.2

(51) Int. Cl.
*B60H 1/00* (2006.01)
*B60H 1/14* (2006.01)
(Continued)

(52) U.S. Cl.
CPC ......... *B60H 1/00914* (2013.01); *B60H 1/004* (2013.01); *B60H 1/00278* (2013.01);
(Continued)

(58) Field of Classification Search
CPC .......... F25B 7/00; F25B 9/008; F25B 25/005; F25B 29/003; F25B 2600/2507;
(Continued)

(56) References Cited

U.S. PATENT DOCUMENTS

2014/0102126 A1* 4/2014 Aoun ................. B60H 1/00328
62/244

FOREIGN PATENT DOCUMENTS

DE 202007011617 U1 2/2009
DE 102010051976 A1 * 6/2012 ......... B60H 1/00899
(Continued)

OTHER PUBLICATIONS

English Machine Translation: DE-102010051976: Accessed via web Aug. 2021.*

*Primary Examiner* — Tavia Sullens
(74) *Attorney, Agent, or Firm* — Brian K. Yost; Decker Jones, PC

(57) ABSTRACT

The invention relates to a flow circuit system (1) for a vehicle, with a first flow circuit (10) guiding a first fluid and operable as a heat pump, and a second flow circuit (50) with a conveying device (31) guiding a second fluid, and a switching device (35), wherein in the provided flow direction of the first fluid downstream of a compressor (3) and upstream of an expansion element (15), at least one first heat exchanger (7) between the first and second fluids, wherein the second flow circuit (50) has at least two flow circuit modes, wherein in the first flow circuit mode, apart from the at least one conveying device (31) for the second fluid and the at least one first heat exchanger (7), at least one outside heat exchanger (37) which may be flowed through by the second fluid and is configured as a radiator is connected to the second flow circuit (50), and in the second flow circuit mode this at least one outside heat exchanger (37) is not connected to the at least second flow circuit (50) containing the conveyor device (31) and the first heat exchanger (7), and preferably is also a heating flow circuit. In this way more flexibility is created in the flow circuit system (1) for a vehicle.

10 Claims, 3 Drawing Sheets

(51) Int. Cl.
*F25B 9/00* (2006.01)
*F25B 25/00* (2006.01)
*F25B 29/00* (2006.01)

(52) U.S. Cl.
CPC ..... *B60H 1/00371* (2013.01); *B60H 1/00392* (2013.01); *B60H 1/00899* (2013.01); *B60H 1/143* (2013.01); *F25B 9/008* (2013.01); *F25B 25/005* (2013.01); *F25B 29/003* (2013.01); *B60H 2001/00307* (2013.01); *B60H 2001/00928* (2013.01); *F25B 2600/2507* (2013.01)

(58) Field of Classification Search
CPC ............ B60H 1/00914; B60H 1/00371; B60H 1/00385; B60H 1/00392; B60H 1/004; B60H 1/00899; B60H 1/143; B60H 2001/00928; B60H 2001/00307
See application file for complete search history.

(56) References Cited

FOREIGN PATENT DOCUMENTS

| | | | |
|---|---|---|---|
| DE | 102011076737 A1 | 12/2012 | |
| DE | 102011076737 | 7/2018 | |
| DE | 202007011617 | 7/2018 | |
| EP | 2660086 A1 | 2/2013 | |
| EP | 2660086 | 7/2018 | |

* cited by examiner

FLOW CIRCUIT SYSTEM FOR A VEHICLE AND METHOD THEREOF

FIELD OF THE INVENTION

The invention relates to a flow circuit system for a vehicle, at least comprising a first flow circuit guiding a first fluid in which, in the provided flow direction of the first fluid, at least one compressor, at least one heat exchanger as condenser or gas cooler, at least one expansion element, and at least one further heat exchanger as an evaporator are arranged, and a second flow circuit guiding a second fluid in which at least one conveyor device is arranged for the second fluid, wherein in the provided flow direction of the first fluid downstream of the at least one compressor and upstream of the at least one expansion element, at least one heat exchanger is arranged to which the first fluid is deliverable in order to establish a heat exchange connection with the second flow circuit. The invention also relates to a vehicle and a method for operation of such a flow circuit system. In particular for vehicles for road or rail traffic with an electrical drive motor as well as pure electric motor vehicles or hybrid motor vehicles such as, for example, with fuel cells and traction battery, such a flow circuit system is used.

BACKGROUND OF THE INVENTION

Prior Art

DE 22 2007 011 617 U1 discloses a flow circuit system for a motor vehicle with two flow circuits each guiding its own fluid wherein a heat exchanger establishes a heat exchanger connection between the two fluids. Here the first flow circuit is acted upon with a supercritically operable first fluid which is compressed with a compressor and can be relaxed again with a downstream expansion device. However, in this case the heat transmission from the heat exchanger to the second fluid in the second flow circuit does not occur in the classic heat pump operation, so that heat absorbed from outside is not pumped via the heat exchanger from the first fluid to the second fluid. Furthermore, when too much heat is transmitted to the second fluid, the second flow circuit acted on with a tempering fluid as the second fluid is not sufficiently flexible.

EP 2 660 086 A1 discloses a flow circuit system from the field of technology also useable for heating for a motor vehicle, which has two flow circuits each guiding its own fluid, wherein a first heat exchanger can implement a heat exchange connection between the two fluids. The first flow circuit can be operated for heating in heat pump operation, but when too much heat is transmitted to the second fluid, the second flow circuit which may be acted upon with a tempering fluid as the second fluid is not operable with sufficient flexibility. The radiator is connectable there for engine cooling to the second flow circuit alternatively to the other second flow circuit and then in operative connection with the engine forms its own differential quasi mini-cooling flow circuit, in which the first heat exchanger is not included. Hence disadvantageously no heat exchange can take place with the first fluid of the first flow circuit.

The invention is therefore based on the problem of providing an improved flow circuit system, in particular for heating, for a vehicle, at least comprising two flow circuits each guiding a fluid, wherein a first heat exchanger can implement a heat exchange connection between the two fluids. A second corresponding problem relates to providing a vehicle with such an improved flow circuit system. A third problem is to provide an improved method for operating such a flow circuit system.

SUMMARY OF THE INVENTION

The first problem is solved by a flow circuit system according to the features of claim 1. Due to the fact that the flow circuit system for a motor vehicle has at least a first flow circuit guiding a first fluid, in which in the provided flow direction of the first fluid at least one compressor, at least one heat exchanger as condenser or gas cooler, at least one expansion element, and at least one further heat exchanger as evaporator are arranged, and a second flow circuit guiding a second fluid, in which at least one conveyor device is arranged for the second fluid, and wherein in the provided flow direction of the first fluid downstream of the at least one compressor and upstream of the at least one expansion element at least a first heat exchanger is arranged, to which the first fluid may be supplied in order to implement a heat exchange connection with the second flow circuit, and wherein at least two flow circuit modes may be switched for the second flow circuit with a switching device, wherein in the first flow circuit mode, apart from the at least one conveyor device for the second fluid and the at least one first heat exchanger, at least one outside heat exchanger preferably designed as a radiator which may be flowed through by the second fluid is connected to the second flow circuit, and in the second flow circuit mode, thus this at least one outside heat exchanger is not connected to the second flow circuit which contains at least the conveyor device and first heat exchanger, and is preferably a heating flow circuit system, the first problem is solved. An outside heat exchanger is designed such that thereby heat from the second fluid may be exchanged directly outward with the air, as for example with a heat exchanger configured as a radiator and suitably positionable in, on, or over the respective motor vehicle.

In a flow circuit system according to the invention, with a switched-on first flow circuit mode, excess heat may be removed outward from the second fluid via the at least one outside heat exchanger, which allows greater flexibility of heat regulation for the motor vehicle.

Furthermore, in this way if the first flow circuit is operated for cooling the motor vehicle, the effect of the at least one first heat exchanger as a gas cooler or condenser can be advantageously increased, which allows a greater cooling performance. On the other hand, when the second flow circuit mode is switched on, the second flow circuit as the normal heating flow circuit system may be operated with heat transmission in the first heat exchanger from the first fluid to the second fluid. As an advantageous side effect, due to switching between the two flow circuit system modes, the conveyor device in the second flow circuit does not need to be switched on or regulated as much.

In the subordinate claims, advantageous embodiments, further developments, and improvements of the respective subject matter of the invention are indicated.

According to one advantageous embodiment of the present flow circuit system according to the invention, the first flow circuit is designed such that therein a supercritically operable fluid is supercritically operable as a first fluid. In such a flow circuit operated at a high internal pressure, the fluid on the high-pressure side is in a supercritical state, so that the heat exchanger cooling the fluid constitutes a gas cooler without condensation. Of course, supercritically operating arrangements for air conditioning of a motor vehicle are disclosed for example in EP 0424 474 B1 and DE 44 32 273 C2, but not for flow circuit systems according to the features of claim 1. The fluids that may be used for a supercritically operated flow circuit are much less environmentally harmful than conventional coolants for subcritical operation of a coolant flow circuit such as FFCs and in particular the commonly used R134a. Also, with a flow circuit supercritically operated as a heat pump, fluids may be used for which the heat pump may also be operated at markedly lower ambient temperatures down to −20° C.

Especially advantageous is CO2 (carbon dioxide), which is supercritically operable in the first flow circuit, and is marketed under the coolant designation R744. In comparison with coolants that are subcritically operated, CO2 does very little environmental damage, can be used at low ambient temperatures down to −20° C. in heat pump operation, and can be acquired simply and cheaply.

According to a further advantageous embodiment of the flow circuit system according to the invention, the second fluid is water. As a tempering fluid in the second flow circuit, especially operating as a heating flow circuit, this is a cheaply acquired fluid with known good heat capacity and may be handled simply and relatively safely.

According to an advantageous further development of the present flow circuit system, in the first flow circuit in the provided flow direction of the first fluid downstream of the at least one compressor and upstream of the at least one expansion element, a further heat exchanger configured as a fluid/air heat exchanger operable as a condenser or gas cooler is arranged.

Thus, not only the first heat exchanger in the first flow circuit may be used as a condenser or gas cooler for cooling the first fluid. With the further heat exchanger usable as a condenser or gas cooler, the first fluid can be cooled so that the cooling performance is thereby generally increased and more easily controllable, and also the heat exchange proceeding in the first heat exchanger from the first fluid to the second fluid is more flexibly controllable. Furthermore, when the first heat exchanger is disconnected by a switched bypass from the coolant flow of the first fluid, cooling of the first fluid continues to be implemented in the further heat exchanger of the first flow circuit.

According to a further advantageous development of the present flow circuit system according to the invention, in the second flow circuit at least in second flow circuit mode, at least one convector and/or heat exchanger for heating the motor vehicle interior is connected or can be connected. In this way at least in the second flow circuit mode, the second flow circuit is especially suited for use as a heating flow circuit for heating the motor vehicle interior.

Preferably at least in the second flow circuit mode, at least one heating device additionally heating the second fluid is connected or connectable to the second flow circuit. In this way the second fluid is additionally heatable, which increases the heating performance of the second flow circuit and makes it more flexible. Furthermore, the second fluid can be preheated thereby, and the danger of freezing of the second fluid can be countered.

According to an advantageous embodiment of the present flow circuit system according to the invention, in the second flow circuit the at least one outside heat exchanger is connectable in parallel such that in the first flow circuit mode, the second fluid apart from the conveyor device, the first heat exchanger, and the at least one outside heat exchanger flows through no further heat exchanger, no convector, and no heating device additionally heating the second fluid. Thus, in the first flow circuit mode the second flow circuit is a quasi mini-flow circuit, in which especially effectively heat transmitted from the first fluid to the second fluid in the first heat exchanger can be released especially effectively from the second fluid into the air, without the motor vehicle interior being heated by the second fluid. The second flow circuit here advantageously serves in the first flow circuit mode only for indirect heat removal from the first fluid of the first flow circuit. With such connection of the outer heat exchanger in the second flow circuit, the cooling action is advantageously increased on the first fluid and thus that of the first flow circuit. Such an indirect increase in the cooling effect on the first fluid is also achieved with an advantageous arrangement of the at least one outside heat exchanger in the second flow circuit, namely switchably arranged in series. Here the at least one outside heat exchanger is connectable in series such that in the first flow circuit mode the second fluid apart from the conveyor device, the first heat exchanger, and the at least one outside heat exchanger also flows through at least one further heat exchanger and/or convector and/or heating device additionally heating the second fluid. In addition, this has the advantage that the temperature of the second fluid can be reduced so as to regulate the temperature of the second fluid for heating the motor vehicle interior, or to counteract it when there is additional heating of the second fluid. In addition, an advantageous combining arrangement of the flow circuit system is feasible in which the at least one outside heat exchanger can be switched between said parallel and series arrangement with a switching device, for example by means of a three-way valve. This permits the advantages of both arrangements of the at least one outside heat exchanger in the first flow circuit mode of the second flow circuit. The switching, device for switching between the first and second flow circuit mode of the second flow circuit is preferably a three-way valve. Such a valve preferably allows simple and readily controllable switching of the two flow circuit modes. The switching device preferably comprises a controller depending on the air temperature of the motor vehicle interior. Such control can be automatic through signals from one or more temperature sensors and comparison with the preset air temperature for the motor vehicle interior. Thus advantageously when the temperature is too high in the motor vehicle interior, the first flow circuit mode can be switched on, and when the temperature is too low the second flow circuit mode.

The flow circuit system according to the invention for an omnibus provided with an electric drive motor is especially advantageously configured. In such an omnibus, the motor heat often does not suffice for heating the motor vehicle interior. The flow circuit system according to the invention is an energy-saving, effective, and flexibly operable system for heating, cooling, and air conditioning of such omnibuses.

Finally, the features of the subordinate claims can be substantially combined freely with one another and are not established in the sequence present in the claims in as much as they are independent of one another.

The second problem is solved by a motor vehicle with a flow circuit system according to the invention. With regard to the advantages and the further advantageous embodiments and further developments, reference is accordingly made to the above embodiments regarding the flow circuit system according to the invention. Preferably a motor vehicle of this type with such a flow circuit system according to the invention is an omnibus provided with an electric drive motor.

The third problem is solved by a method for operating the flow circuit according to the invention, wherein this comprises, when an increase in the cooling performance of the first flow circuit is needed, the method step of switching the first flow circuit mode of the second flow circuit.

Due to the fact that in the first flow circuit mode of the second flow circuit, the at least one outside heat exchanger is connected to the second flow circuit, heat there is released to the air outside from the second fluid, so that in the first heat exchanger more heat can be released to the second fluid from the first fluid, which then in the first flow circuit on the low-pressure side, thus downstream of the at least one expansion element and upstream of the at least one compressor, the result is increased cooling performance.

In particular when there is a third flow circuit which guides a third fluid and is in heat exchange connection to the first flow circuit through a further heat exchanger, the cooling performance of the third flow circuit for example for cooling the air for a region of the motor vehicle interior is increased.

BRIEF DESCRIPTION OF THE DRAWINGS

With reference to the drawings, exemplary embodiments of the invention are explained:
Wherein.

DESCRIPTION OF THE PREFERRED EMBODIMENTS

All drawings are to be understood schematically. To-scale figures are dispensed with for purposes of increased clarity of the representation.

Figure 1:
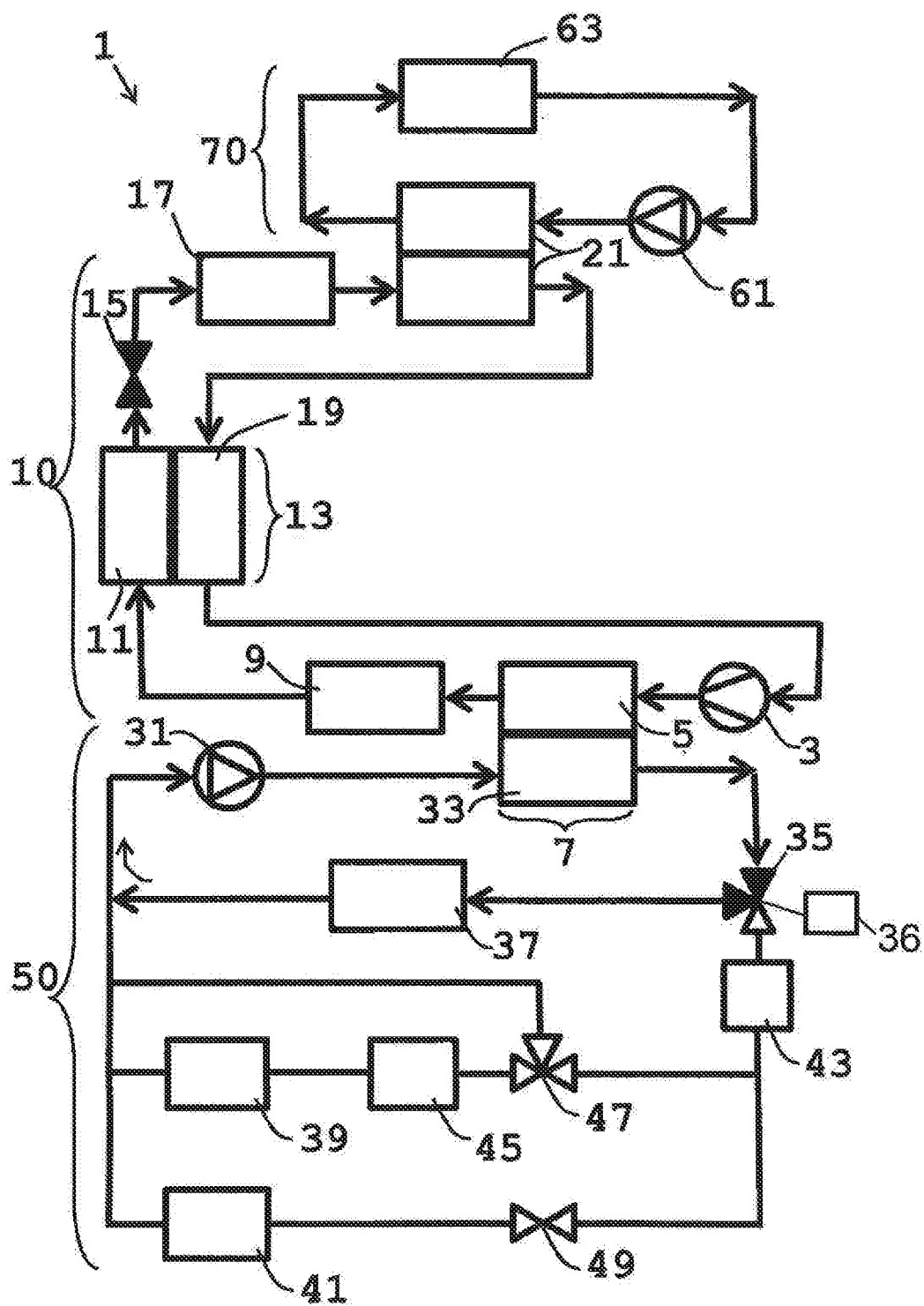
FIG. 1 as the main schematic shows an embodiment of the flow circuit system according to the invention for a vehicle in the first flow circuit mode of the second flow circuit, FIG. 2 as the main schematic shows the embodiment in FIG. 1 of the flow circuit system according to the invention for a vehicle in the second flow circuit mode of the second flow circuit, and FIG. 3 as the main schematic shows a further embodiment of the flow circuit system according to the invention for a vehicle.

In FIG. 1 as the main schematic an embodiment of the flow circuit system 1 according to the invention is shown for a vehicle in the first flow circuit mode of the second flow circuit 50. The first flow circuit 10 contains a first fluid that is guided in the first flow circuit 10. In this exemplary embodiment the first flow circuit 10 is configured in such a pressure-resistant manner and its components are designed such that the first fluid can be operated therein in the supercritical range. The first fluid is $CO_2$ (carbon dioxide).

There are also other coolants conceivable as the first fluid for supercritical operation. In the provided flow direction of the first fluid, in the first flow circuit 10, connected via coolant lines, in particular the following components of a heat pump flow circuit suited for supercritical operation are incorporated:

A compressor 3, the first side 5 of the first heat exchanger 7, a further heat exchanger 9 configured as a fluid/air heat exchanger as a gas cooler for heat exchange with the outer air, the high-pressure 11 of a heat exchanger 13 configured as an inner heat exchanger, an expansion element 15 configured as an expansion valve, a heat exchanger 17 configured as an evaporator, a further heat exchanger 21 and upstream of the entry to the compressor 3, the low-pressure side 19 of the heat exchanger 13 configured as an inner heat exchanger.

The second flow circuit 50 via the first heat exchanger 7, which is integrated with its first side 5 in the provided flow direction of the first fluid downstream of the compressor 3 and upstream of the expansion element 15 in the first flow circuit 10 is thermally coupled to the first flow circuit 10. The first heat exchanger 7 included both in the first flow circuit 10, namely with its first side 5, and in the second flow circuit 50, namely with its second side 33. The second flow circuit 50 guides a second fluid, which is a tempering fluid. As the second fluid, water or for example a glycol-water mixture may be considered. Also, other usual tempering fluids are conceivable as the second fluid. From the conveyor device 31 configured as a water pump, the second fluid can be pumped through the second side 33 of the first heat exchanger 7, in order to pick up heat from the first fluid flowing through the first side 5. The first heat exchanger 7 in this case is formed as a plate heat exchanger. Other known widely used types of suitable first heat exchangers 7 are conceivable for heat exchange between the first and second fluid. The different embodiments, that the first heat exchanger 7 is connectably arranged in the first flow circuit 10 with a bypass and valve for the flow-through of the first fluid, or that the first heat exchanger 7 constitutes the only gas cooler or condenser in the first flow circuit 10, are also conceivable.

The second flow circuit 50 has an outside heat exchanger 37, here a radiator, which is connectable with a switching device 35, in this case a three-way valve. Two or more such connectable outside heat exchangers 37 are also conceivable. The outside heat exchanger 37 in this case is connected with the switching device 35 to the second flow circuit 50, so that the first flow circuit mode of the second flow circuit 50 is connected. The outside heat exchanger 37 is connected in parallel, thus the second fluid pumped through the conveyor device 31 and the second side 33 of the first heat exchanger 7 flows further through the outside heat exchanger 37, where heat is released from the second fluid outward into the air, and from there flows on to the inlet side of the conveyor device 31. The at least one outside heat exchanger 37 is provided in the exemplary embodiment to be positioned outside the vehicle interior or it/they 37 for a flow circuit system 1 built into the vehicle is/are built outside of the vehicle interior. Triangles of a symbolized valve marked in black instead of white show in FIGS. 1 and 2 the opening of the valve for the line of the respective fluid connected thereto. In this first flow circuit mode of the second flow circuit 50, the represented further components such as the heat exchanger 39 provided for heating the air in the vehicle interior, the convector 41 likewise provided thereto, and the heating devices 43 and 45 which may additionally heat the second fluid are not connected, i.e. are not flowed through by the second fluid. The arrows shown in FIGS. 1 and 2 give the flow direction of the respective fluid.

In the provided flow direction of the first fluid in the first flow circuit 10 downstream of the expansion element 15 and upstream of the compressor 3, an optional further heat exchanger 21 is arranged in order to implement a heat exchange connection with an optional third flow circuit 70, which is a cooling flow circuit, guiding a third fluid. Also conceivable is an embodiment of the flow circuit system 1 according to the invention in which in the first flow circuit 10 upstream of the first heat exchanger 21, especially an expansion element 15 is arranged functionally parallel to the expansion element 15 upstream of a heat exchanger 17 integrated as an evaporator. The third flow circuit 70 is represented only in very simplified form with the conveyor device 61 integrated therein, a further heat exchanger 21 and for example a traction battery 63 to be cooled or other vehicle component to be cooled. The first flow circuit 10 is thus operable in heat pump operation. The flow circuit system 1 shown in FIG. 1 is configured for an omnibus, or bus, provided with an electric motor. Other road or rail vehicles, preferably electrical or hybrid motor vehicles can likewise be provided with an accordingly configured embodiment of the flow circuit system 1 according to the invention.

Furthermore, an embodiment of the flow circuit 10, in which the first fluid is operated in the subcritical range, as with the usual HFC coolant, basically is also conceivable.

Figure 2:
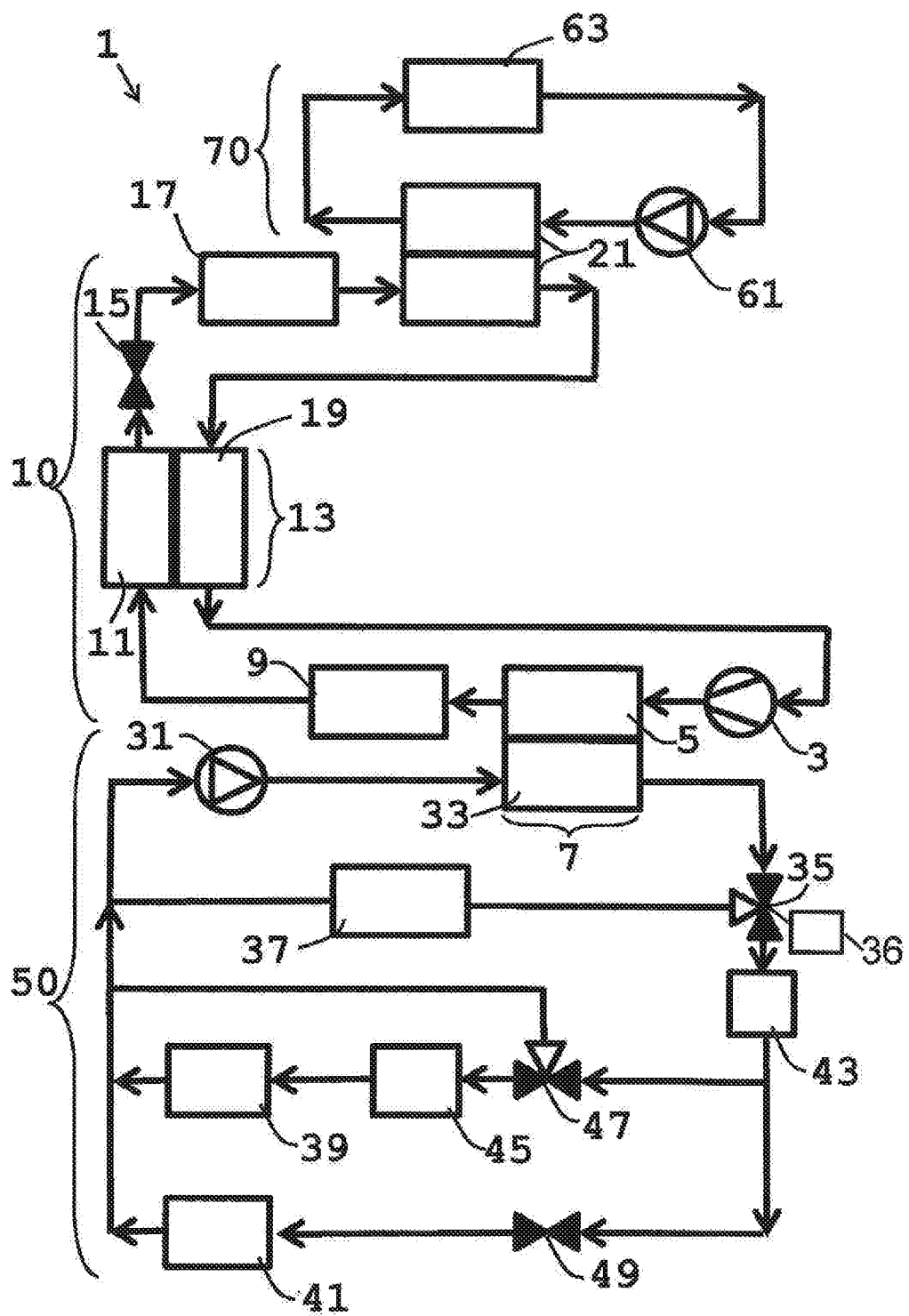

In FIG. 2, as the main schematic the embodiment shown in FIG. 1 of the flow circuit system 1 according to the invention for a vehicle in the second flow circuit mode of the second flow circuit 50 is represented. As regards the description of the first flow circuit 50 with its components and the third flow circuit 70 and its components, reference is made to the above description of FIG. 1. In the second flow circuit 50 however, the switching device 35 comprising a three-way valve is connected such that the outside heat exchanger 37 is not connected to the second flow circuit 50, thus the switching device 35 has closed the line to the outside heat exchanger 37 to through flow of the second fluid. For the second fluid however, the switching device 35 is opened such that the second fluid is guided by the conveyor device 31 through the second side 33 of the first heat exchanger 7 further through the usual lines for such heating flow circuits to an optional heating device 43 for additionally heating the second fluid. From there the second fluid flows according to the connection of the further valves 47, 49 either directly to the inlet of the conveyor device 31 or first before that through the convector 41 in the vehicle interior and/or through further heating device 45 for additionally heating the second fluid and the heat exchanger 39 for heating the interior of the vehicle. Thus, the second flow circuit mode is switched on for the second flow circuit 50 by the switching device 35. In the heat exchanger 39, heat is released from the second fluid into the air of the vehicle interior or a region of the vehicle interior, such as for example the region of the vehicle driver. Several heat exchangers 39 integrated into the second flow circuit 50 for heat exchange from the second fluid to the interior air at various points of the vehicle interior for heating various regions of the vehicle interior are also conceivable. For this purpose, known embodiments with valve connections are conceivable, which along with the convector(s) 41 allow heating of the individual regions of the vehicle interior independently of one another with heat from the second fluid heat exchangers 39. The heating devices 43, 45 comprising heaters for example are continuous-flow or PTC heaters suitable and known for this purpose and run on a 400 V AC current.

The exemplary embodiment shown in FIGS. 1 and 2 optionally has a controller 36 for the switching device 35 for switching the first or second flow circuit mode of the second flow circuit 50. This controller 36 comprises for example the automatic controls of the switching device 35 depending on the air temperature of the vehicle interior. If the temperature of the previously cooler interior air of the vehicle interior does not reach the present temperature of 20° C., for example, measured by the temperature sensors not shown in FIGS. 1 and 2, through the controller 36 of the switching device 35, a switch is made of the second flow circuit mode to the first flow circuit mode of the second flow circuit 50. If the measured air temperature in the vehicle interior drops below a preset value, however, for example 19° C., the controller 36 of the switching device 35 automatically switches from the first flow circuit mode of the second flow circuit 50 to the second flow circuit mode, so that then the second flow circuit 50 is operated as a heating flow circuit for heating the vehicle interior. However cumulatively or alternatively, other parameters, such as the outside temperature or a cooling requirement in the third flow circuit 70 are also conceivable, on which the controller 36 of the switching device 35 for both flow circuit modes can depend.

Figure 3:
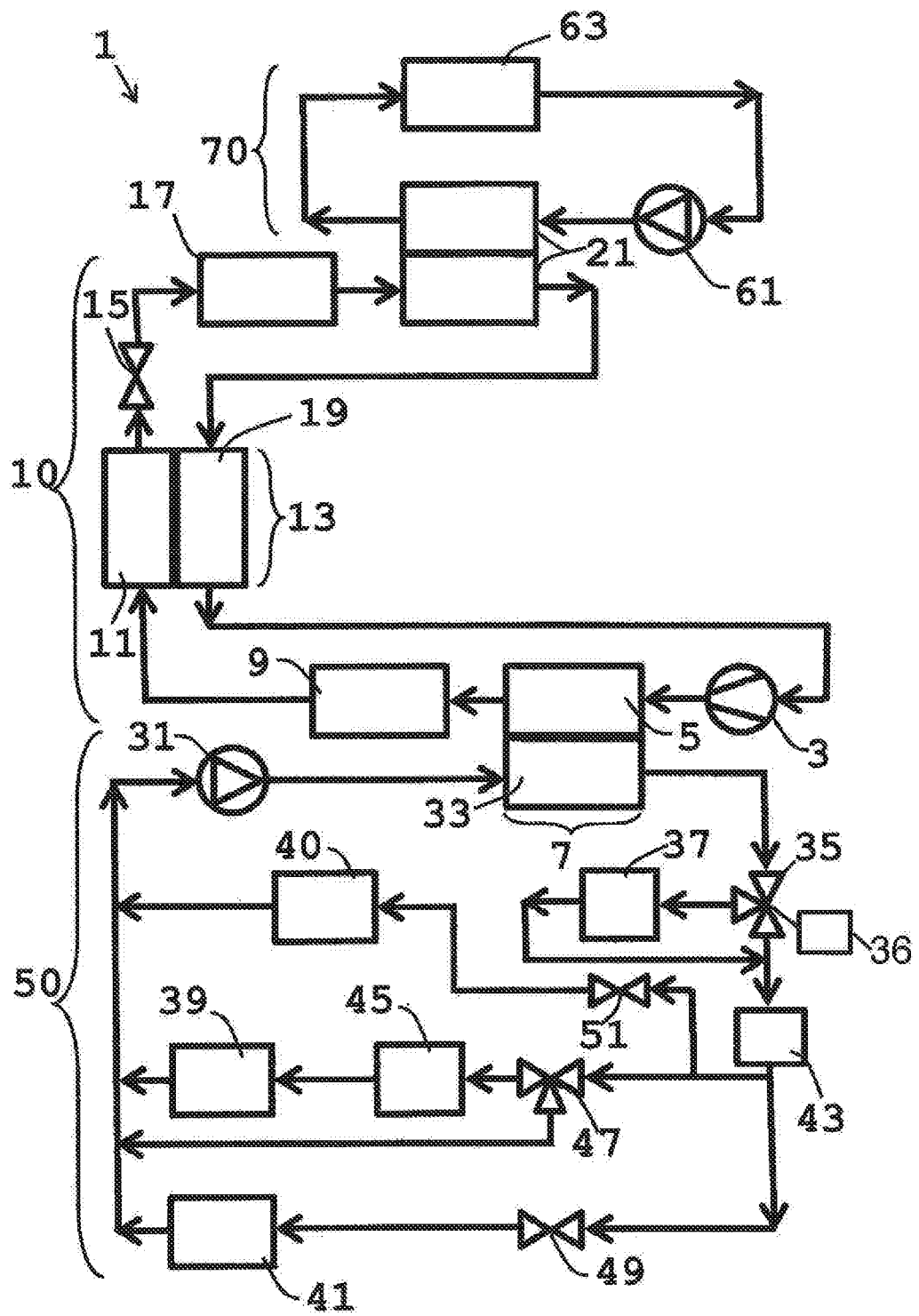

FIG. 3 shows as the main schematic a further embodiment of the flow circuit system 1 for a vehicle according to the invention. The basic structure for the first flow circuit 10 and the third flow circuit 70 corresponds to the exemplary embodiment of a flow circuit system 1 shown in FIGS. 1 and 2.

As regards the description of the first flow circuit 10 with its components and reference symbols and the third flow circuit 70 with its components and reference symbols, reference is made to the above description of FIGS. 1 and 2.

A conveyor device 31 and the second side 33 of the first heat exchanger 7 are integrated into the second flow circuit 50. The conveyor device 31, in this case configured as a water pump, pumps the second fluid through a pipe to and through the second side 33 of the first heat exchanger 7. In the heat exchanger 7 the second fluid absorbs heat from the first fluid of the first flow circuit 10 flowing through the first side 5 of the heat exchanger 7. The second fluid is water, for example. The switching device 35 downstream in the flow direction of the second fluid in the second flow circuit 50 of the second side 33 of the first heat exchanger 7 depending on the connection either opens the way for the second fluid on the outside heat exchanger 37, so that the second flow circuit 50 is connected in the first flow circuit mode, or does not open the way to the outside heat exchanger 37, but allows the second fluid to flow on to the heating device 43 for additionally heating the second fluid, so that then the second flow circuit mode in the second flow circuit 50 is switched on. In the outside heat exchanger 37, which is configured as a radiator, in the first flow circuit mode heat is released into the outside air from the second fluid guided in the second flow circuit 50. The at least one outside heat exchanger 37 is provided in the exemplary embodiment for this purpose to be positioned outside the vehicle interior, or it/they 37 are built outside of the vehicle interior for a flow circuit system 1 that is built into the vehicle. The outside heat exchanger 37 in the first flow circuit mode of the second flow circuit 50 is connected in series. When the first flow circuit mode is switched on, the second fluid downstream of the outside heat exchanger 37 flows through the heating device 43, which additionally heats the second fluid. After that, depending on the connection of the further valves 47, 49, and 51 it flows directly on to the inlet of the conveyor device 31 or first flows through the convector 41 in the vehicle interior and/or through the heating device 45 which additionally heats the second fluid and the heat exchanger 39 to heat the air for a vehicle interior region and/or also through the heat exchanger 40 for heating the air for another vehicle interior region. The two vehicle interior regions may be for example the driver's seat region and the passenger seat region of an omnibus. In the second flow circuit mode, thus without connected outside heat exchanger 37, downstream of the heating device 43, depending on the connection of the further valves 37, 49, and 51, accordingly as in the first flow circuit mode the convector 41, the heating device 45, and the heat exchangers 39 and 40 can be flowed through by the second fluid before reaching the inlet of the conveyor device 31.

With respect to the optional controller 36 of the switching device 35, which in this case, without being limited thereto, comprises a three-way valve, reference is made to the above descriptive embodiments of FIGS. 1 and 2 in this regard.

Also conceivable is a variant of the embodiment of the second flow circuit 50 of the flow circuit system 1 according to the invention in which the outside heat exchanger 37 in the first flow circuit mode is connectably arranged in parallel or in series. This may be implemented for example downstream of the outside heat exchanger 37 by an additional direct return line provided with a valve to the inlet of the conveyor device 31 in the thus expanded exemplary embodiment of FIG. 3.

The exemplary embodiment shown in FIG. 3 is configured or usable for an omnibus provided with an electric drive motor. Other street or rail vehicles, preferably electric or hybrid motor vehicles can likewise be provided with an accordingly configured embodiment of the flow circuit system 1.

As regards the flow circuit systems shown in FIGS. 1, 2, and 3 and other embodiments of the flow circuit system according to the invention, the following applies: Due to the fact that in the first flow circuit mode of the second flow circuit 50, the at least one outside heat exchanger 37 is connected to the second flow circuit 50 and there heat is released to the outside air from the second fluid, so that in the first heat exchanger 7 more heat can be released to the second fluid from the first fluid, which then in the first flow circuit 10 on the low-pressure side, that is downstream of the expansion element 15 and upstream of the compressor 3, results in improved cooling performance. There through the further heat exchanger 21 a heat exchange connection of the first fluid, of the first flow circuit 10 arises with the third flow circuit 70 guiding the third fluid, so that in this way the cooling, performance of the third flow circuit 70 for cooling for example the air for a region of the vehicle interior or a traction battery 63 is increased. The method of operation of the flow circuit system 1 according to the invention thus comprises, when there is a need to increase the cooling performance of the first flow circuit 10 and thus also possibly that of the third flow circuit 70, the method step of switching the first flow circuit mode of the second flow circuit 50.

The invention claimed is:

1. A flow circuit system for a vehicle, comprising:
a first heat exchanger comprising first and second sides;
a first flow circuit guiding a first fluid in a flow direction;
the first flow circuit comprising at least one compressor and the first side of the first heat exchanger;
the first side of the first heat exchanger structured and arranged as a condenser or gas cooler;
the first flow circuit further comprising at least one expansion valve, and a second heat exchanger structured and arranged as an evaporator;
a second flow circuit guiding a second fluid, the second flow circuit comprising a pump adapted to convey the second fluid;
the second flow circuit further comprising the second side of the first heat exchanger;
wherein, in the flow direction of the first fluid, the first side of the first heat exchanger is positioned downstream of the at least one compressor and upstream of the at least one expansion valve such that the first heat exchanger is adapted to implement a heat exchange between the first fluid present within the first side of the first heat exchanger and the second fluid present within the second side of the first heat exchanger;
the second flow circuit comprising one or more valves and a switching device, the switching device being arranged in serial to said second flow circuit one or more valves, the switching device being adapted to control flow of the second fluid, such that the second flow circuit has at least two flow circuit modes, wherein in a first flow circuit mode, the second fluid flows through the pump, the second side of the first heat exchanger, and an outside heat exchanger but not through an additional heat exchanger, a convector, or an additional heater which may additionally heat the second fluid;
wherein in a second flow circuit mode, the second fluid flows through the pump, the second side of the first heat exchanger, and at least one further connected second flow circuit heat exchanger but does not flow through the outside heat exchanger, but, in the second flow circuit mode, all of the second fluid flows through the switching device.

2. The flow circuit system according to claim 1, wherein the first flow circuit is configured such that the first fluid is supercritically operable.

3. The flow circuit system according to claim 2, wherein the first fluid is $CO_2$.

4. The flow circuit system according to claim 1, wherein the second fluid is water.

5. The flow circuit system according to claim 1, wherein the first flow circuit further comprises, in the provided flow direction of the first fluid, downstream of the at least one compressor and upstream of the at least one expansion valve, a further connected first flow circuit heat exchanger configured as a fluid-air heat exchanger and operable as a condenser or gas cooler.

6. The flow circuit system according to claim 1 wherein the second flow circuit comprises a heater adapted to heat the second fluid while the second flow circuit is in the second flow circuit mode.

7. The flow circuit system according to claim 1, wherein the switching device comprises a three-way valve.

8. The flow circuit system according to claim 1, wherein the switching device comprises a controller dependent on the air temperature of the vehicle interior.

9. The flow circuit system according to claim 1, the first flow circuit comprising, in the provided flow direction of the first fluid, downstream of the at least one expansion valve and upstream of the at least one compressor, at least one further heat exchanger, to which the first fluid may be supplied in order to implement a heat exchange connection with a third flow circuit guiding a third fluid, the third flow circuit being a closed flow circuit.

10. The flow circuit according to claim 1, configured for a bus provided with an electric drive motor.

* * * * *